United States Patent

Melen et al.

[11] Patent Number: 5,956,391
[45] Date of Patent: Sep. 21, 1999

[54] BILLING IN THE INTERNET

[75] Inventors: Björn Melen; Mika Hyvönen, both of Jorvas, Finland

[73] Assignee: Telefonaktiebolaget LM Ericsson, Stockholm, Sweden

[21] Appl. No.: 08/798,466

[22] Filed: Feb. 10, 1997

Related U.S. Application Data

[60] Provisional application No. 60/012,686, Mar. 1, 1996.

[30] Foreign Application Priority Data

Feb. 9, 1996 [FI] Finland .................................. 960619

[51] Int. Cl.⁶ .................................................. H04M 15/00
[52] U.S. Cl. .......................... 379/114; 379/111; 379/115; 379/229; 705/40
[58] Field of Search .................................. 379/111, 112, 379/114, 115, 118, 120, 121, 122, 127, 130, 134, 136, 201, 219, 220, 221, 229, 230, 100.04, 100.06, 100.03, 100.13, 100.15, 100.17; 370/389, 392, 352, 401; 705/25, 29, 40

[56] References Cited

U.S. PATENT DOCUMENTS

| | | | |
|---|---|---|---|
| 5,146,491 | 9/1992 | Silver et al. | 379/114 |
| 5,469,500 | 11/1995 | Satter et al. | 379/201 |
| 5,608,786 | 3/1997 | Gordon | 379/100 |
| 5,710,918 | 1/1998 | Lagarde et al. | 395/610 |
| 5,737,414 | 4/1998 | Walker et al. | 380/4 |
| 5,745,556 | 4/1998 | Ronen | 379/127 |
| 5,794,221 | 8/1998 | Egendorf | 705/40 |
| 5,845,267 | 12/1998 | Ronen | 705/40 |

FOREIGN PATENT DOCUMENTS

| | | | |
|---|---|---|---|
| WO90/11661 | 10/1990 | WIPO | H04M 11/08 |
| WO96/38018 | 11/1996 | WIPO | H04Q 11/04 |
| WO97/01920 | 1/1997 | WIPO | H04M 15/00 |
| WO97/03410 | 1/1997 | WIPO | G06F 17/60 |

OTHER PUBLICATIONS

International Search Report re PCT/FI97/00082 Date of Mailing of search report: Jul. 8, 1997.

*Primary Examiner*—Curtis A. Kuntz
*Assistant Examiner*—Binh K. Tieu
*Attorney, Agent, or Firm*—Burns, Doane, Swecker & Mathis, L.L.P.

[57] ABSTRACT

A terminal (1, 2) connected to the public telephone network PSTN has access to the Internet-connecting node by dialling a service number. In the access node the server gives the terminal a temporary IP-address and sets up the connection to the area network (15) or to the worldwide Internet (11) offering chargeable services. In order to bind the A-number and the IP-address to each other and thus bill the user for the chargeable services the procedure is as follows: when setting up the connection to the service number, the telephone exchange (4), containing the intelligent network switching functions, informs the intelligent network Service Control Point (SCP) (14) of both the user's (1 or 2) A-number and the device location identification (C') of the telephone exchange (4) from which the connection has been setup to the router (6) entry point in the access node. The entry point is given the same identification (C') as the device location connected to the point, and a message is sent to SCP containing the temporary address given to the terminal for the connection time as well as the router (6) entry point identification. In SCP the billing program binds to each other the A-number and the terminal's temporary IP-address having the same device location identification and router entry point identification. The intelligent network database has the data of the providers of chargeable services, which data include at least their IP-addresses. When the terminal is connected to the chargeable service, the local area net server informs the IP-address of the service and the IP-address of the terminal to the Service Control Point (SCP).

11 Claims, 4 Drawing Sheets

BILLING IN THE INTERNET

This application claims the benefit of U.S. Provisional application Ser. No. 60/012,686, filed Mar. 1, 1996.

TECHNICAL FIELD OF INVENTION

The invention relates to billing of services purchased through the data transmission network and especially to billing of Internet services.

BACKGROUND OF THE INVENTION

Internet is a network which connects the local area networks of thousands of firms, universities and other organizations. There is no centralized user or service directory in the net, but the user has to search the relevant subjects himself. Any kind of information can be transmitted in the network and anyone can establish an own service available for everyone. Computers having different programs and operating systems communicate using the TCP/IP (Transport Control Protocol/Internet Protocol), which is a common nomination for Internet's two most important protocols. The data to be transmitted is divided by its length into (1–1500 byte) IP-packets, which are routed to the right positions by the network router according to the address data in the packets. TCP attends to the maintaining of a reliable connection between the transmitter and the receiver. It collects the incoming IP-packets into right order and requests if necessary a retransmission. The packet addresses, i.e. the addresses of the computers in the network, consist nowadays of four FIGS. 0–255 separated by dots, which four number combination is called the IP-address (IPv4). The address is hierarchical, the first part of the address specifying the network number, generally the national prefix comes first, and the latter part tells the computer number within the network. The computer is given an IP-address when connected to Internet. The use of the addresses is facilitated by the network DNS-address service (Domain Name Service), which converts the computer names into IP-addresses and vice versa. The user can therefore refer to the names of the computers and the services instead of their numeric addresses. As the DNS-service is completely distributed to cover different parts of Internet-network, the separate local area network Domain Name Servers can inquire addresses from each other if required.

The rapid growth of Internet services and users will with in a few years cause the traffic in the net to tangle. As a result of this the TCP/IP-protocol may have to be substituted by a more developed link protocol. The change is also urged by the running short of Internet-addresses, especially c-class addresses, and by the poor applicability of the IP-traffic as now to real-time data transfer.

Almost all Internet-services are used based on the client server-principle, i.e. the client program in the user's computer gets in connection with the service provider server program, which then performs the work. E-mail is perhaps the most used service, which a private user can utilize by purchasing a personal mail-box from an Internet connection provider. The private user can then retrieve into his work station the messages from the network server (mail office) in the network, using POP (Post Office Protocol).

WWW (World Wide Web) has become the most important service form. It is a worldwide WWW-server network containing the HTML-documents (HyperText Markup Language) WWW is a hypermedia-network, which means that it only exists virtually, i.e. in electronic form. The hyperdocument is one entity, which can contain text, pictures, sound, moving picture. The document can comprise several pages. Some words or pictures in the text are links distinguishable on the screen or display, the activation of which by clicking starts the transfer to the user, to an invisible URL-address (Uniform Resource Locator) referred to in the link armature and brings a new document to the screen. Every WWW-server has a defined root, usually containing the file intended to be watched first. This is usually called the home page. Moreover every subdirectory generally contains a file which is the initial document of this directory. WWW can be accessed both with graphic user interfaces such as e.g. Mosaic, Netscape and Cello and text-based user interfaces such as e.g. Lynx.

A hyperdocument has usually a webmaster, who updates the document data.

A home user or a small company without an own local area network and not having direct access to the Internet computer can use the SLIP- (Serial Line Internet Protocol) or the PPP-(Point to Point Protocol)-connection or the terminal link program to get in contact with the Intern et computer. This computer is here called a connecting node, as from the Internet viewpoint it is one node having an address and represents to the user an access point to Internet. The node can e.g. be according to FIG. 1. The average home user has not a local area network to connect to Internet, but in accordance with FIG. 1 the user can have access through the public switching telephone network (PSTN) to the local are a network of some Internet contact company either from the ISDN user interface of the exchange or switch 4 by means of the computer 2 provided with an ISDN-adapter or from an analog user interface of the exchange or switch connected through a modem 3 to the computer 1 serial line port (RS232-, i.e. the so called COM-port(serial interface)). The computer 1 can instead of an external modem be provided with an internal modem card.

Those using the dial-up network analog user interface and modem 3, are connected to the modem pool 5 linked to the router 6. The connection is established so that the computer 1 data communications program sets up a connection to the router 9, which serves as DHCP-server. The local area network and thus also the users 1 and 2 are connected to the Internet-world through the router 10. Router 10 routes the transmitted IP-packets according to their addresses to the right networks and functions also as a traffic delimiter if necessary.

The connection described above between the user and the contact company local area network is usually for the home users of an ordinary switched telephone network, but the contact companies also offer fixed connections in co-operation with the teleoperator.

Computer 7 handling the users' E-mail traffic is an important component in the local area network, being the one from which the computers 1 and 2 can fetch their E-mail using the POP protocol. Another important local area network component is the local PROXY-server 8. The PROXY-server can also be behind the router 10 in Internet. The PROXY-server acts as the network service cache and also as a gateway between the company's own local area network and Internet. It saves into its own memory e.g. the latest retrieved Internet files or WWW-pages, from which the users in the same PROXY-server can quickly reread them into their own computer.

To enable the user 1 who has connected his computer via a modem to a public telephone line, to use graphic client programs and the WWW-browsing, SLIP (Serial Line Internet Protocol) or PPP (Point to Point Protocol) is used in the data transfer between the user and the local area network. The protocol converts the modem line into an Internet cable and extends the Internet TCP/IP-telecommunication link to include the public telephone line from one modem to another, in the figure between terminal 1 and router 6. SLIP enables the Internet-communications using the computer serial line port, whereby the computer behind the serial interface becomes to a work station connected to the network.

One special feature of Internet is that the use of it has up till now been almost free of charge. Internet communication costs have been covered by public means, by authorities or universities. The user has during one session been able to be in connection with computers all over the world and receive a great amount of information free of charge. The contact company offering Internet-connections charges of course a connection (access) fee and a fixed monthly fee.

The extent of the network and the amount of users have caused companies, communities and also private persons to produce an own Internet WWW-page to present their products and services. The aim of the companies and the communities is to obtain public attention and to create new contacts with prospective customers.

A WWW-based ordering system has been suggested enabling the merchant to order the desired products from different distributors using his own computer. In this system the invoicing is however made traditionally afterwards outside Internet. Some progressive businessmen already offer this kind of service merely on an experimental basis.

For the electronic trading it has been suggested a system in which the seller gives a general presentation of his shop and its products on his own home page. From this page there are links to the complete product catalogues. Having chosen the product, the buyer clicks a certain link, which brings an order form on the screen. The buyer fills in the form and adds his credit card number. After receipt of the order, the seller's server generates a confirmation message and sends it to the buyer. The disadvantage of such an electronic trade is the security risk involved in the transfer and handling of the credit card number.

The common feature of all the suggested ordering methods is that the invoicing is done traditionally, always separately and afterwards. This involves however the risk that the client orders the product without any intention to pay for it. It is also possible for someone to order in the false name and have the product delivered to a third party, or someone who snatched the credit card number makes orders and the invoice is sent to the right owner of the credit card.

One solution to the problems mentioned above would be to connect the service charging to the telephone bill for such users, who according to FIG. 1 use the dial-up telephone network for the connection to Internet. This would improve the reliability of ordering, as the origin of the call is known and excludes the possibility of ordering services anonymously. The present arrangements do not however enable this, as the operator charging for the calls does not know the IP-address of the user's computer. Furthermore, the user's telephone number, the IP-address of the computer and the chargeable Internet-service prices are separate information.

DISCLOSURE OF THE INVENTION

The objective of this invention is thus a method of buying articles and/or services, in which billing of products and services offered through Internet is handled in a way characteristic for the telephone network charging, where a single service or purchase is registered and added to the product purchaser's or telephone service user's bill, preferably to the telephone bill of the calls. The charging of the service utilized or the article purchased should be based on the connection time, a pulse per connection, a fixed price or a combination of these. The bill can naturally also be sent separately to the service user or the product purchaser as is customary e.g. in connection with credit card purchases. Further objectives are systems for establishing bases for an indentification of an user terminal or an user and a method for the same.

The objectives set are achieved in the way presented in the claims.

From the terminal user interface, which is e.g. the user's terminal interface according to the agreement with the teleoperator, a connection is setup to the network, through which at least one predetermined service and/or article seller, who made an agreement with the teleoperator, offers articles and services of different prices to be purchased. According to the invention, the user interface data are first of all identified when the connection is setup or during the connection. Secondly, the seller's data as well as the price of the selected article or service are identified when an article and/or service is chosen from the user interface. The identification is made during the connection. The data of the identified user interface and the seller are combined in order to charge the subscription user the price of the article or the service.

In a preferable form of embodiment the user, i.e. the A-subscriber, calls through the modem or ISDN-adapter from the user interface to the access node, i.e. to the number of the contact company offering the interface service, which is a B-number. From the telephone exchange (switch), which also is the SSP (Service Switching Point) of the intelligent network (IN-service), the A-number and the B-number are transferred to the intelligent network SCP (Service Control Point) for use of the billing program, which provides the A-subscriber with a billing record containing the A- and B-numbers. The intelligent network informs the telephone exchange about the re-switching of the call to the number C defined for the service provider, provided the calling A-number is entitled to the service. In other case the access is prevented or blocked. This function can be used to fulfill possible service restriction conditions. The subscriber must by this restriction condition e.g. be able to restrict the use of the phone to basic calls only and prevent calls to other services. The telephone exchange makes the switching to the device location C' corresponding to the C-number and informs the identification of the device location C' to the intelligent network. The device location identification C' is added to the billing record, whereafter the intelligent network has record of the A-number, the B-number and the device location identification C'.

The call starts as normally from the PSTN exchange device location C' and comes to the entry point of the access node. The point and the exchange device location have a complete analogy, therefore the same device location identification as in the telephone exchange can for order's sake be used for the point, i.e. identification C'. From the point the call proceeds to the contact company's server/router indicated by the B-number, which now has record of the device location identification C' in the exchange, from where the call comes. The server/router gives the "visible" calling computer behind this device location an Internet-address I to be used in the normal way during the connection time. Both the device location identification C' and the given Internet-address I are informed to the intelligent network, where the billing program which earlier received the A-number and the device location identification C' combines the received data having the same device location identification C' and gets as a result a record of the A-number and its given I-address. The user can hereafter move in the different networks at his choice.

The user is initially connected via the access node to the area network MAN offering Internet-services, and can act according to the agreed charges and rules within this network. The user's A-number is known, therefore the billing can be based on this number. The intelligent network has record of the chargeable service providers's database in the area network, MAN.

When the user moves from the area network MAN into the worldwide Internet, the access node sends a message to the intelligent network that the user has moved to use Internet services. Correspondingly when the user returns to the services within the MAN-network, the access node sends a message to the intelligent network about the return back to the area network MAN.

When the user moves to the chargeable services within the MAN-network, the access node informs the intelligent network about this. All the user's control requests to chargeable services in the MAN-net are transmitted by the access node, which means that always when the user moves to a service advertised on some WWW-page, the access node receives information about the subscriber's IP-address as well as the service provider's IP-address. Both addresses are transmitted to the intelligent network, which now knows that the A-number subscriber using the IP-address in question has moved to a chargeable service obtainable from the certain IP-address. The basis for the billing of the service is thus established. When the user makes a purchase in the chargeable service, the access node receives information about the purchase and informs the intelligent network about this purchase.

The billing of the service utilized or the article bought is based on a fixed lump sum, on the connection time or a single pulse per connection or a combination of these. A software transfer can e.g. be charged as a lump sum or as a combination of the connection time and the lump sum. Pools and lotto are examples of service or article billing, in which an electronic coupon can be filled in the own computer and transferred to the pools office, which sends a receipt of the transaction using E-mail. The user corresponding to the telephone number can then be charged for the pools. Further application examples of the proposed system are e.g. mail-order selling and securing of the authenticity and billing of such articles as home-delivery of pizza, etc. as well as electronic media services and articles, such as programs and their update, products, text, picture, sound, piece of music or e.g. video.

DETAILED DESCRIPTION OF EMBODIMENTS

The invention is in principle adapted for use in the whole worldwide Internet, but in practice it is preferable to apply the invention in a sub-network forming a restricted number space. This is practical, as in most cases the buyer wants the article supplier to be geographically close. Such a sub-net is the area network 15 in FIG. 2, which can be a Metropolitan Area Network (MAN) covering a geographically limited area such as a city or in Finland e.g. a province or perhaps all Finland. Other networks can be connected to the sub-net with a gateway if required. The communication traffic would be implemented as in the international telephone traffic, but however so that the A-number data is transferred in the net.

Service providers are connected to the sub-net 15, some of them offering services free of charge and some of them offering chargeable services or service events S1 and S2. Those telephone numbers that can utilize the chargeable services according to the invention are recorded in the intelligent network database SDP as a number space. These telephone numbers have access to the service providers' numbers (B-numbers), which act as the intelligent network triggers. The amount entitled to the service can be restricted by entering as a criteria for the access the user's (A-number) geographical location, e.g. when ordering pizza the distribution area, i.e. the border for home delivery. The data about the service providers, possible access criteria and service prices can be recorded into the intelligent network SDP (Service Data Point).

Figure 1:
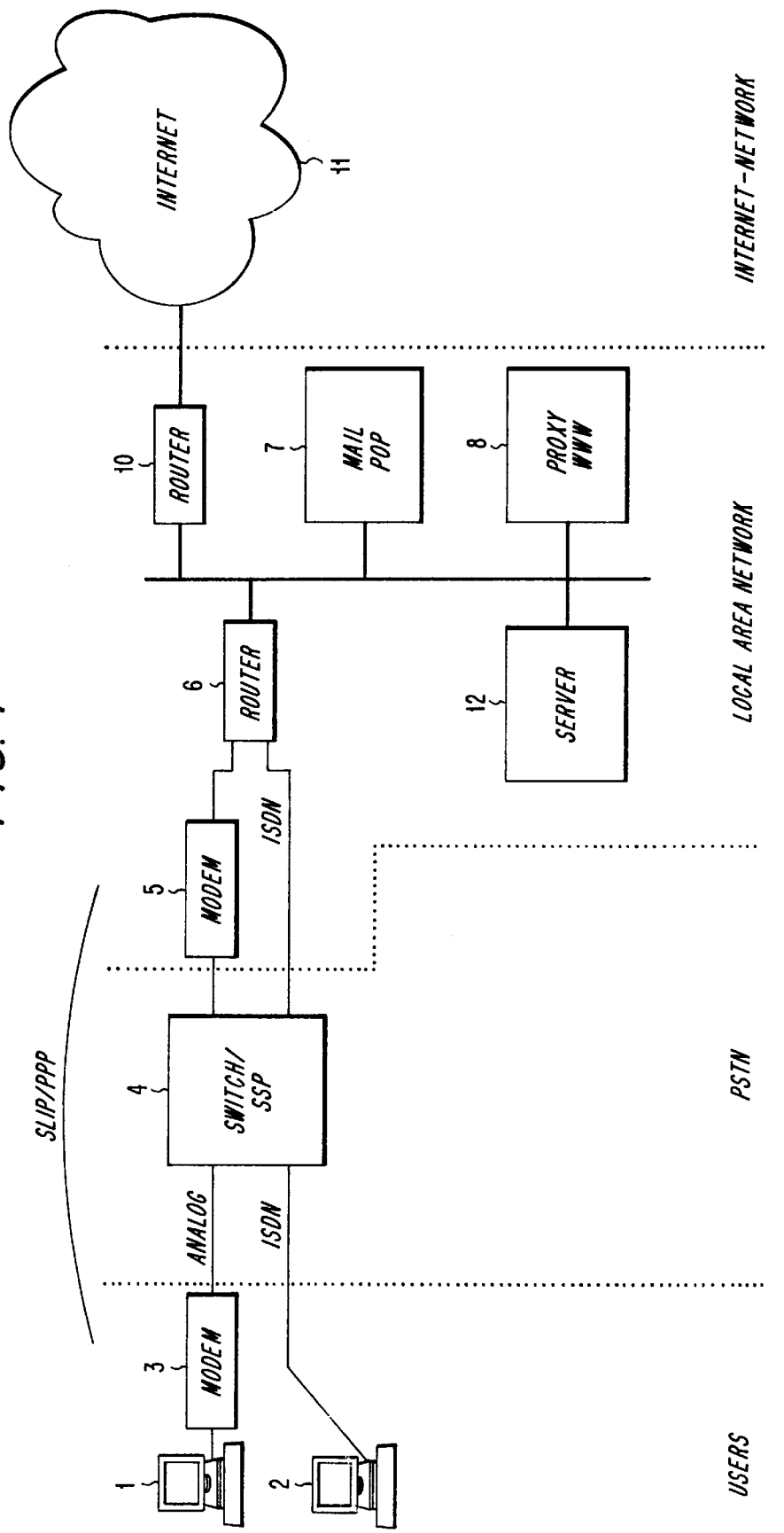
FIG. 1 presents schematically the connection of a private user to the local area network of a company selling Internet-connection.

The user has access to the worldwide Internet (WAN) and the sub-net (MAN) through the access node offering the access service. The access node can comprise a computer, which from the Internet viewpoint is one node having an IP-address, and which offers the PSTN/ISDN-subscriber access to Internet. In a preferable form of embodiment described below, the access node is presumed to be the contact company's local area network according to FIG. 1.

The connection to the local area network is setup as a normal call as follows: The user calls through his modem 3 or ISDN-adapter from his user interface the contact company's service number, which is a B-number. The telephone exchange 4 is also the SSP (Service Switching Point) of the intelligent network IN-service, i.e. the exchange contains the intelligent network service switching functions, wherefore there is access from the exchange to the intelligent network IN services. In case the exchange is not provided with the service switching functions, the call is routed in the normal way to the nearest exchange having these functions. This is not essential for the invention.

The exchange 4 identifies whether the A-subscriber's number is included in the number space having access to the B-numbers. Such a subscriber restriction regarding the access can be made if desired. The restriction can be utilized to fulfill e.g. some possible service restriction conditions: the subscriber must have the possibility to prevent the use of the phone for other calls than the actual basic calls. If the access condition is fulfilled or the condition is not stated, the B-number is checked. The exchange 4 is provided with a point in BCSM (Basic Call State Model) where the call control can be interrupted in order to start the intelligent network service. The B-number acts as such a service trigger, resulting in that SSP sends to the intelligent network and there to SCP (Service Control Point) a message to take into use the billing program according to the invention, which message contains the A-number and the B-number. The message is transferred according to the INAP-protocol through the signalling network. SCP, which physically can be located in the same exchange or in connection with some other exchange, defines for the call a re-switching to number C given to the service provider. After this SCP sends to the exchange 4 a reply message containing the switching data C, in response to which the telephone exchange switches to the starting side device location C' of the exchange corresponding to the C-number. Exchange 4 then informs the device location C' identification to the intelligent network SCP billing program, which updates the billing record. The intelligent network has at this stage records of the A-number, the B-number (and the C-number) as well as the device location identification C'.

Thereafter the call switching continues as normally: from the telephone exchange 4 output side device location C' the call proceeds to a certain entry point of the router 6 connecting the local area network and the PSTN-network, which entry point is for the user the access point to Internet. The device location and the entry point have a complete analogy, wherefore the router's entry point is also given the identification C' in order to make the invention more intelligible. The A-subscriber is now in connection with the contact company's LAN-network through the router 6. The A-subscriber computer gets thereafter in contact with the router 9 using e.g. the DHCP-protocol or Radius-server and receives from the controller a temporary IP-address. The IP-address and the device location C' data are transmitted to the server 12 containing the required service program. The controller and the server can physically be the same device. The server/router has now record of the device location identification C' of the incoming call. A charge is defined for the connection from the terminal to the local area network in the same way as in the telephone traffic generally.

The server 12 or the router 9 sends through the SS#7-signalling network to the intelligent network 14 SCP the INAP-message, which contains the terminal IP-address and its device location identification C' for the incoming call. IP-address and C can be sent also as tcp/ip message by using local area network. SCP has already previously received information about the device location identification C' and the A-number related thereto, therefore it can easily combine the data containing the same device location identification C'. As a result, SCP has record of the user's A-number and the IP-address given by the local area network to the user's computer.

The router 9 updates the router 6 routing tables so that the A-subscriber has access to a restricted address space within the MAN-network 15.

The user is now connected to the local area network (LAN) of the company offering Internet connection service and also to the area network (MAN) and can act according to agreed charges and rules in the nets. He can read messages from the local area network mail box 7 and record them as well as use the area network MAN services. The user's A-number is recorded, wherefore the billing can also be made based on the A-number.

When the user wants to go outside the MAN-net, to e.g. the worldwide Internet 11, he clicks a link on his screen, which information is transmitted to the router 9, which changes the routing file so as to give the A-subscriber's computer access to the WAN-net. The connection is routed to Internet-network, whereafter the user can move in the wide Internet-network. When the router 9 routes the user's connection to the worldwide Internet (WAN), it simultaneously sends a message through the signalling network to the intelligent network 14 SCP for the use of the billing program that the user has moved to use the Internet services. The message contains the user's IP-number, based on which SCP knows the user's A-number. SCP converts the billing bases to correspond with the changed situation. The billing can e.g. be based on time charging.

When the user requests access to return to the services in the MAN-net, the router changes the routing file and informs through the signalling network about the change of network to the intelligent network SCP for the use of the billing program. SCP changes the billing bases to correspond with the new network.

As described above, information about the user's IP-address and the network is transmitted to the intelligent network always when the user moves from one net to another.

When the user moves to the MAN-network 15 containing chargeable services, it can simultaneously be established whether he is entitled to use the chargeable services. One procedure is as follows: when the user wants to move to the MAN-network 15 containing chargeable services such as S1 and S2, he clicks in the normal way the link on his screen. Computer 1 or 2 gets in connection with the PROXY-server 8, which resolves based on its own data and in co-operation with the intelligent network SCP the user's right to move in this network. If the user is allowed access to the chargeable services in the MAN-net, the PROXY-server 8 sends information about this through the signalling network to the intelligent network 14 SCP and thereby for the use of the billing program.

If the user wants to move to a chargeable service advertised on some WWW-page within the MAN-network 15, he sends a request by clicking the link on this page. The request goes to the local area network PROXY-server 8, which as a response to the request calls the service provider server. When the connection is setup, the service provider server has received information about the local area network PROXY-server's 8 IP-address requesting the access, and the PROXY-server 8 itself knows the user's IP-address. The PROXY-server informs both addresses to the intelligent network, which now knows that the A-number connection using the IP-address in question has moved to a certain chargeable service. The billing bases are thus established. When the user makes a purchase in the chargeable service offered in the MAN-network 15, the PROXY-server 8 receives information about the purchase, because the user's control requests are transmitted by the PROXY-server 8, which thus communicates both with the user's terminal and the service provider server. Although the service provider only sees as the purchaser's address the address of the PROXY-server 8, the A-subscriber can be charged as the PROXY-server 8 itself knows the A-subscriber's IP-address and has submitted this information to the intelligent network and the intelligent network service program has record of all the numbers.

The billing can be performed in several different ways. The server can transmit the information about the purchase to the intelligent network 14 SCP for the use of the billing program, which based on the information given by service provider and recorded in the database calculates the price to be charged the A-number.

It is also possible for the intelligent network SCP to inform the PROXY-server 8 of the user's A-number and for the PROXY-server to form the billing record. The service providers' database can in that case be located with the contact company, which then can directly calculate the sum to be added to the billing record. The subscriber data required to form the billing record can alternatively be forwarded by the server to the service provider server. The server informs the record to the PROXY-server, which forwards it to the intelligent network.

It is further possible for the service provider server to inform directly the sum to be added to the billing record. In such a case the chargeable service providers' database need not to be recorded in the intelligent network.

The charge can be defined both when entering and always when transferring from one chargeable service to another. This is possible because the PROXY-server sends a message to the SCP-exchange always when the A-subscriber moves to another service.

When the user returns from the MAN-network 15 offering chargeable services to the local area network or to the WAN-net, the PROXY-server informs the intelligent network about this.

The same principle can be applied if the MAN-net is to be separated from the local LAN-net but still offer the subscriber a favorable way of using restricted services, such as E-mail and similar services. In that case the A-subscriber's access to the MAN-net via the router 13 is restricted by informing the router 6 about the restriction. This method enables to offer the A-subscriber the chargeable services S1 and S2 in the MAN-net area although the subscriber has not access to the MAN-net.

The service can also be expanded so that the A-subscriber does not have to provide his address data when ordering a chargeable service either S1 or S2 from the chargeable services. The address of the A-subscriber is known if the order is placed from a fixed network extension line.

When the session is to be terminated the A-subscriber closes the connection. The A-subscriber's intelligent network SSP connected to the exchange 4 observes this and sends information to SCP, and the charging is stopped. SCP sends information about the closing of the connection to the local area network router 9, which thereafter updates the routing data and releases the IP-address used.

Figure 2:
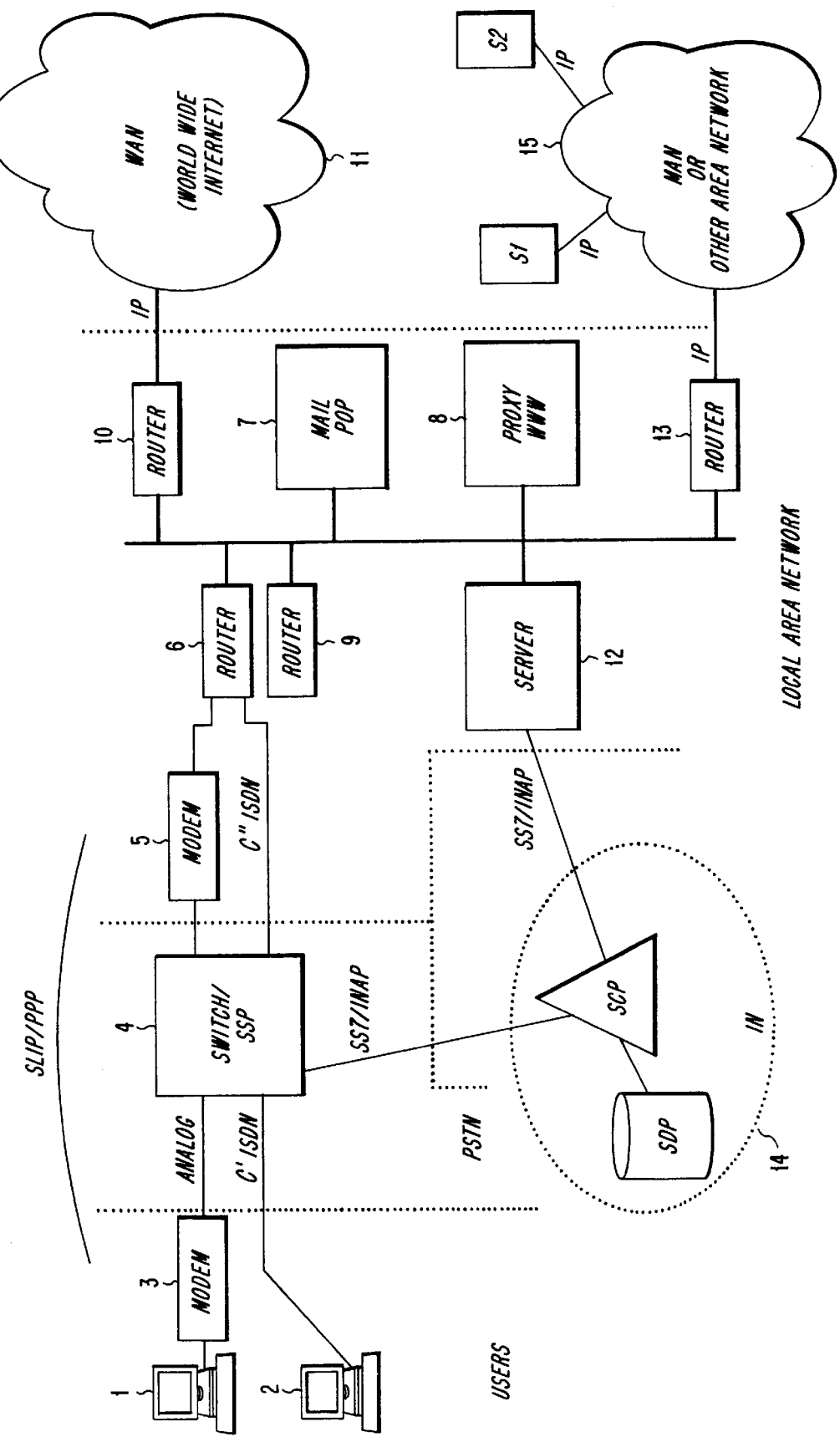
FIG. 2 presents a network structure applicable for the embodiment of the method.
Figure 3:
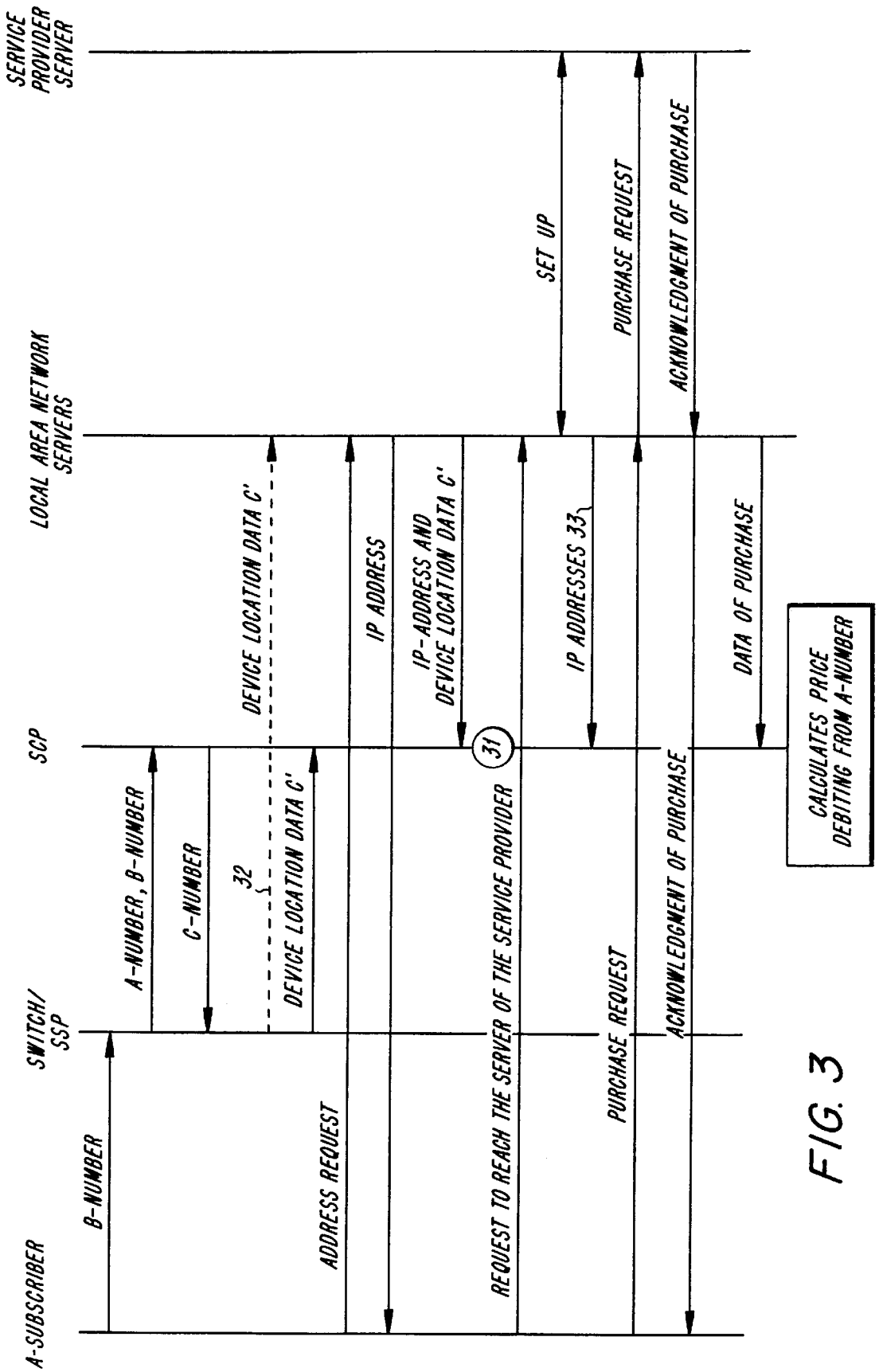
FIG. 3 presents a feasible signalling in the method according to the invention.
Figure 4:
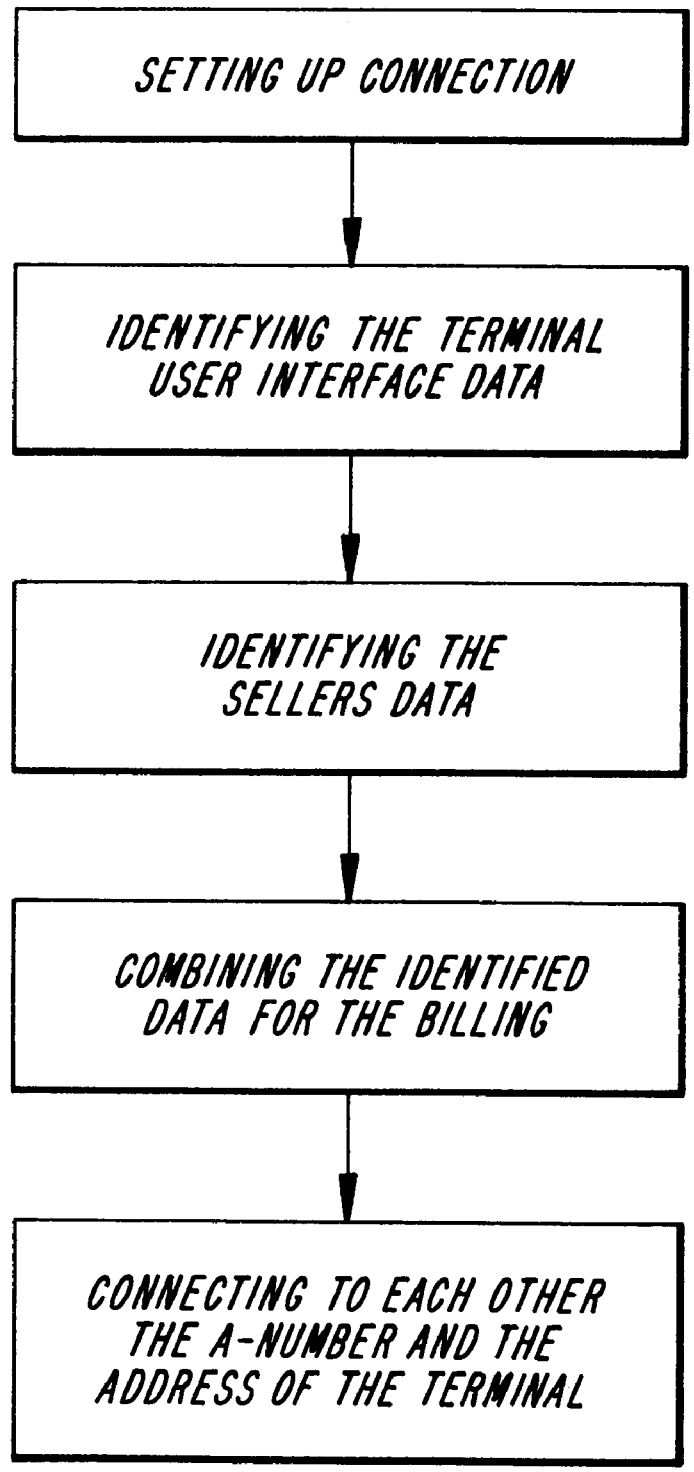
FIG. 4 presents a flow chart of one embodiment of the present invention.

FIG. 3 presents the signalling, which illustrates in main parts the description of FIG. 2. According to the main idea of the invention the intelligent network SCP is provided with a record which contains at least the user's A-number, the temporary IP-address given by the local area network to the user as well as the B-number dialled by the user in case it is the intelligent network service number. These data have been obtained at phase 31 of FIG. 3. The arrow 32 from the exchange to the local area network server is presented dashed because the data is not directly signalled to the local area network but the local area network resolves it from the router's entry point data. The arrow from the local area network server to SCP illustrates the transfer of both the A-subscriber's IP-address and the service provider's IP-address. When the information about the user's purchase, arrow 34, has reached SCP, it calculates the price which is charged from the A-number.

To an expert within the field it is obvious that the basic idea of the invention can be embodied in several different ways. The invention and its forms of embodiment are thus not to be considered restricted to the examples described above but can vary within the scope of the claims. There are e.g. different alternatives for the data contained in the message concerning chargeable services transmitted from the local area network to the intelligent network. It can contain merely the price, which SCP adds to the billing record, or the service provider's code, in which case SCP searches the data corresponding to the code from its database and acts according to this. In time charging, entering into the service starts the counter and exiting from the service stops it. The counter can be located in the local area network and/or in SCP or SSP. The WAN- and MAN-networks are not restricted to the example described above, but the networks can be grouped in different ways parallel or hierarchically and there can be several networks.

The user may be a mobile telephone user/subscriber. The computer user can log in to the network also wireless. This is possible by using e.g. the applicant s DC 12, DC 23 system. Then a modem card is connected between the mobile phone and the computer and the communication occurs wireless between the mobile telephone and the base station. The connections from/to base stations are known to the skilled persons. In addition, it is clear to the skilled person that the arrangemet may well comprise more than one exhange 4.

We claim:

1. A method of purchasing articles and/or services, said method comprising the steps of:

setting up a connection from a terminal to a data network via a user interface, at least one service and/or article provider offering for sale articles and/or services through said network;

identifying an address of the terminal in the user interface on the basis of signaling data transmitted during the setting up of said connection;

identifying an address by which the terminal is known in the data network during the connection;

identifying a seller's data and a price of a chosen article and/or service for a connection time, when the user chooses via the user interface and the data network an article and/or service; and combining the identified address data for billing a purchaser for the chosen article and/or service based on terminal user connection records in the user interface.

2. The method according to claim 1, further comprising the steps of:

verifying that said terminal is authorized to carry out said step of choosing an article and/or service via the data network; and allowing the terminal to carry out said step of choosing an article and/or service via the data network if it is determined that the terminal is authorized to do so; and preventing the terminal from carrying out said step of choosing an article and/or service via the data network if it is determined that the terminal is not authorized to do so.

3. The method according to claim 1, wherein the user interface is a public telephone network, the data network is the Internet, and an Internet access node connects the public telephone network to the Internet, and wherein said address of the terminal in the user interface is a telephone number (A-number) and the address of the terminal in the data network is an Internet protocol (IP) address.

4. The method according to claim 3, wherein a group of A-numbers entitled to use the chargeable services available via the user interface and the data network are recorded in a database of the user interface.

5. The method according to claim 3, wherein when the connection has been set-up between the terminal and the data network via the Internet access node, a record entry is created regarding the established connection, and wherein said record entry contains the A-number and a time when the connection was established.

6. The method according to claim 3, wherein when the connection has been set-up between the terminal and the data network via the Internet access node, a record entry is created regarding the established connection, and wherein said record entry contains the A-number, an address of a server of the service provider, and details of the service provided.

7. The method according to claim 3, wherein when the Internet access node disconnects the connection between the terminal and the data network, the Internet access node also sends information to a billing program regarding the disconnection, said disconnection information including the A-number, the address of the terminal in the data network, and a disconnection time.

8. The method according to claim 3, further comprising the step of:

recording the identified address data in an intelligent network of the user interface.

9. The method according to claim 3, further comprising:

recording the identified address data in an intelligent network of the user interface; sending said A-number and a device location identification to the intelligent network from a telephone exchange connecting said terminal to said Internet access node, the device location identification being the entry point into said access node for said terminal; and sending said IP address together with said device location identification to the intelligent network from a network server connected to the Internet access node, wherein the device location identification is used in the intelligent network to associate the A-number and the IP address.

10. The method according to claim 9, wherein the step of setting up the connection between said terminal and the Internet access node comprises the step of:

sending a telephone number of a remote terminal (B-number) from said terminal to a telephone exchange of the public telephone network.

11. A system for purchasing articles and/or services, said system comprising:

a terminal;

a data network over which a service and/or article provider can offer for sale articles and/or services;

a user interface for connecting providing a connection between said terminal and said data network;

means for identifying an address of the terminal in the user interface on the basis of signaling data transmitted during the setting up of said connection, an address by which the terminal is known in the data network during the connection, and seller's seller data, and a price of a chosen article and/or service, for a connection time when a user chooses via the user interface and the data network, an article and/or service; and means for combining the identified data for billing a purchaser for the chosen article and/or service based on terminal user connection records of an exchange of the user interface.

* * * * *

UNITED STATES PATENT AND TRADEMARK OFFICE
CERTIFICATE OF CORRECTION

PATENT NO. : 5,956,391
DATED : September 21, 1999
INVENTOR(S) : Björn MELEN et al.

It is certified that error appears in the above-identified patent and that said Letters Patent is hereby corrected as shown below:

Column 1, line 31: change "FIGS." to --figures--;

Column 1, lines 46-47: change "with in" to --within--;

Column 1, lines 53-54: change "client server" to --client/server--;

Column 2, line 21: change "Intern et " to --Internet--;

Column 2, lines 28-29: change "are a" to --area--;

Column 10, line 3: change "applicants s" to --applicants'--.

Signed and Sealed this

Twenty-fourth Day of October, 2000

Attest:

Attesting Officer

Q. TODD DICKINSON
Director of Patents and Trademarks